US009697751B2

(12) United States Patent
Ramos

(10) Patent No.: US 9,697,751 B2
(45) Date of Patent: Jul. 4, 2017

(54) INTERACTIVE REPRESENTATION OF CLUSTERS OF GEOGRAPHICAL ENTITIES

(75) Inventor: Gonzalo A. Ramos, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 657 days.

(21) Appl. No.: 12/720,548

(22) Filed: Mar. 9, 2010

(65) Prior Publication Data

US 2011/0225541 A1 Sep. 15, 2011

(51) Int. Cl.
*G09B 29/00* (2006.01)
*G09B 29/10* (2006.01)
*G06F 3/0482* (2013.01)
*G06F 17/30* (2006.01)
*H04N 21/431* (2011.01)
*G06F 3/0481* (2013.01)
*G01C 21/36* (2006.01)

(52) U.S. Cl.
CPC ..... *G09B 29/007* (2013.01); *G06F 17/30241* (2013.01); *G09B 29/10* (2013.01); *G01C 21/3682* (2013.01); *G06F 3/0481* (2013.01); *G06F 3/0482* (2013.01); *G06F 3/04817* (2013.01); *G06F 17/30899* (2013.01); *G06F 2203/04806* (2013.01); *H04N 21/4314* (2013.01)

(58) Field of Classification Search
CPC .. G06F 3/0481; G06F 3/04817; G06F 3/0482; G06F 17/30899; G06F 2203/04806; H04N 21/4314; G01C 21/3682; G09B 29/007; G09B 29/10

USPC ................. 715/798, 800, 801, 790
See application file for complete search history.

(56) References Cited

U.S. PATENT DOCUMENTS 4,574,364 A 3/1986 Tabata et al.
5,497,454 A 3/1996 Bates et al.
(Continued)

FOREIGN PATENT DOCUMENTS

JP 2008-051538 A 3/2008
KR 20030037453 5/2003

OTHER PUBLICATIONS

"EveryBlock Seattle: Seattle Local News and Public Records", Retrieved from: <http://seattle.everyblock.com/> on Feb. 2, 2010, (2010),2 pages.
(Continued)

*Primary Examiner* — Abdullah Al Kawsar
*Assistant Examiner* — Mong-Shune Chung
(74) *Attorney, Agent, or Firm* — Rainier Patents, P.S.

(57) ABSTRACT

Various embodiments enable, in a mapping context, various visual entities to be clustered into groups that do not occlude one another. In at least some embodiments, individual clusters are represented on a map by a puddle defined by a computed contour line. Users can interact with the puddle to acquire more information about the puddle's content. In at least some embodiments, user interaction can include zooming operations, clicking operations, hovering operations and the like.

20 Claims, 14 Drawing Sheets

(56) References Cited

U.S. PATENT DOCUMENTS

| | | |
|---|---|---|
| 5,499,334 A | 3/1996 | Staab |
| 5,519,809 A | 5/1996 | Husseiny et al. |
| 5,561,757 A | 10/1996 | Southgate |
| 5,590,265 A | 12/1996 | Nakazawa |
| 5,651,107 A | 7/1997 | Frank et al. |
| 5,758,264 A | 5/1998 | Bonta et al. |
| 5,852,810 A | 12/1998 | Sotiroff et al. |
| 5,945,985 A | 8/1999 | Babin et al. |
| 6,040,833 A | 3/2000 | Henshaw |
| 6,075,531 A | 6/2000 | DeStefano |
| 6,092,076 A | 7/2000 | McDonough |
| 6,222,537 B1 | 4/2001 | Smith et al. |
| 6,549,218 B1 | 4/2003 | Gershony et al. |
| 6,640,185 B2 | 10/2003 | Yokota et al. |
| 6,772,195 B1 | 8/2004 | Hatlelid et al. |
| 6,856,901 B2 | 2/2005 | Han |
| 6,883,146 B2 | 4/2005 | Prabhu et al. |
| 6,983,203 B1 | 1/2006 | Wako |
| 6,995,778 B2 | 2/2006 | Noble et al. |
| 6,996,783 B2 | 2/2006 | Brown et al. |
| 7,054,478 B2 | 5/2006 | Harman |
| 7,076,741 B2 | 7/2006 | Miyaki |
| 7,336,260 B2 | 2/2008 | Martin et al. |
| 7,343,046 B2 | 3/2008 | Curry et al. |
| 7,523,405 B2 | 4/2009 | Robertson et al. |
| 7,570,272 B2 | 8/2009 | Dooley et al. |
| 7,573,487 B1 | 8/2009 | Petersen |
| 8,149,249 B1 | 4/2012 | Oplinger |
| 8,560,228 B2 | 10/2013 | Feldbauer |
| 2002/0065605 A1 | 5/2002 | Yokota |
| 2002/0163547 A1 | 11/2002 | Abramson et al. |
| 2003/0011601 A1 | 1/2003 | Itoh et al. |
| 2003/0229441 A1 | 12/2003 | Pechatnikov et al. |
| 2004/0261037 A1 | 12/2004 | Ording et al. |
| 2005/0107949 A1 | 5/2005 | Yokota |
| 2005/0219268 A1 | 10/2005 | Kyle |
| 2005/0251331 A1 | 11/2005 | Kreft |
| 2005/0270311 A1 | 12/2005 | Rasmussen et al. |
| 2006/0005114 A1 | 1/2006 | Williamson et al. |
| 2006/0080032 A1 | 4/2006 | Cooper |
| 2006/0184313 A1 | 8/2006 | Butler |
| 2007/0050129 A1 | 3/2007 | Salmre |
| 2008/0005674 A1 | 1/2008 | Wattenberg et al. |
| 2008/0059889 A1 | 3/2008 | Parker et al. |
| 2008/0086356 A1 | 4/2008 | Glassman et al. |
| 2008/0281869 A1 | 11/2008 | Liu et al. |
| 2009/0012953 A1 | 1/2009 | Chu et al. |
| 2009/0024315 A1* | 1/2009 | Scheibe .......... G01C 21/367 701/532 |
| 2009/0055774 A1 | 2/2009 | Joachim |
| 2009/0100363 A1 | 4/2009 | Pegg et al. |
| 2009/0110302 A1 | 4/2009 | Snow |
| 2009/0132511 A1 | 5/2009 | Yang et al. |
| 2009/0313267 A1 | 12/2009 | Girgensohn et al. |
| 2010/0023259 A1 | 1/2010 | Krumm et al. |
| 2010/0088631 A1 | 4/2010 | Schiller |
| 2010/0115407 A1* | 5/2010 | Kim et al. ............ 715/708 |
| 2011/0010650 A1 | 1/2011 | Hess et al. |
| 2011/0041088 A1* | 2/2011 | Mason .............. G06F 3/04817 715/767 |
| 2011/0046881 A1 | 2/2011 | Karaoguz |
| 2011/0161875 A1* | 6/2011 | Kankainen ........... G06F 3/0481 715/810 |
| 2011/0173572 A1 | 7/2011 | Van Zwol et al. |
| 2011/0225546 A1 | 9/2011 | Ramos |
| 2011/0313649 A1 | 12/2011 | Bales et al. |
| 2012/0017168 A1 | 1/2012 | Mason et al. |
| 2012/0316782 A1 | 12/2012 | Sartipi et al. |
| 2013/0249812 A1 | 9/2013 | Ramos et al. |

OTHER PUBLICATIONS

Beran, Bora "HYDROSEEK: An Ontology-Aided Data Discovery System for Hydrologic", *Thesis*, Drexel University, Available at <http://citeseerx.ist.psu.edu/viewdoc/download?doi=10.1.1.93.145 &rep=rep1&type=pdf>,(Sep. 2007),pp. 1-145.

Kleiweg, Peter et al., "Geographic Projection of Cluster Composites", *Diagrammatic Representation and Inference, Third International Conference, Diagrams 2004*, Cambridge, UK, Available at <http://www.let.rug.nl/~kleiweg/papers/kleiweg04.pdf>,(Mar. 2004),3 pages.

Mummidi, Lakshmi et al., "Discovering Points of Interest from Users' Map Annotations", *Reprint of version in GeoJournal 2008*, Available at <http://research.microsoft.com/en-us/um/people/jckrumm/Publications%202008/map%20annotationsl%20preprint. pdf>,(2008),pp. 1-25.

Popescu, Adrian et al., "Creating Visual Summaries for Geographic Regions", *Institut TELECOM Bretagne*, Available at <http://georama-project.labs.exalead.com/publication/popescu_kanellos_final.pdf>,(Apr. 6, 2009),6 pages.

Ramos, Gonzalo et al., "Tumble! Splat! Helping Users Access and Manipulate", *AVI 2006*, (May 2006),pp. 428-435.

"Non-Final Office Action", U.S. Appl. No. 12/720,503, Mar. 28, 2014, 20 pages.

"Non-Final Office Action", U.S. Appl. No. 13/429,232, Mar. 27, 2014, 21 pages.

Xia, et al., "A Clustering Algorithm based on Delaunay Triangulation", Proceedings of the 7th World Congress on Intelligent Control and Automation, Jun. 25, 2008, pp. 4517-4521.

"Auto-Highlight Areas of Any Map Image", Retrieved from: <http://www.webresourcesdepot.com/auto-highlight-areas-of-any-map-image/> on Feb. 3, 2010, (Feb. 12, 2008), 2 pages.

"Non-Final Office Action", U.S. Appl. No. 12/720,503, (Jun. 6, 2013), 17 pages.

"PCT Search Report and Written Opinion", Application No. PCT/US2011/026755, (Aug. 25, 2011),10 pages.

"What does OECD eXplorer enable you to do? An introduction to its main features", Available at <http://www.oecd.org/dataoecd/55/47/44084514.pdf>,(Jun. 29, 2009), pp. 1-33.

Burigat, Stefano et al., "Decluttering of Icons Based on Aggregation in Mobile Maps", *Map-based Mobile Services—Design, Interaction and Usability*, Springer, Berlin, 2008, Available at <http://bilder.buecher.de/zusatz/23/23169/23169025_lese_1.pdf>,(Aug. 2008), 21 pages.

Crampton, Jeremy W., "Interactivity Types in Geographic Visualization", *Cartography and Geographic Information Science*, vol. 29, No. 2, Available at <http://www.geog.psu.edu/courses/geog421/private/Crampton%20galleys.pdf>,(Apr. 2002) , pp. 1-15.

Fisher, et al., "Spatial Filters—Gaussian Smoothing", Retrieved from <http://homepages.inf.ed.ac.uk/rbf/HIPR2/gsmooth.htm> on May 30, 2013, (2003), 7 pages.

Khan, Azam "Spotlight: Directing Users' Attention on Large Displays", *CHI 2005, PAPERS: Enhancing Virtual Spaces and Large Displays*, Available at <http://portal.acm.org/citation.cfm?id=1054972.1055082>,(Apr. 2005), pp. 791-798.

Mathewson, Tim et al., "Realtime Observation Monitoring and Analysis Network", *A National Joint Project Between Interagency Meteorologists and the University of Utah*, Available at <http://www.blm.gov/colorado/rmafwx/roman.pdf>,(2003), 22 pages.

"Final Office Action", U.S. Appl. No. 12/720,503, Dec. 24, 2013, 19 pages.

"Foreign Office Action", CN Application No. 201180012983.5, 07/30214, 16 pages.

"Final Office Action", U.S. Appl. No. 12/720,503, Jan. 9, 2015, 21 pages.

"Final Office Action", U.S. Appl. No. 13/429,232, Oct. 22, 2014, 22 pages.

"Foreign Office Action", CN Application No. 201180012983.5, Mar. 19, 2015, 12 pages.

"Non-Final Office Action", U.S. Appl. No. 13/429,232, Mar. 26, 2015, 21 pages.

Response filed Jun. 20, 2014 to Non-Final Office Action mailed on Mar. 27, 2014 from U.S. Appl. No. 13/429,232, 17 pages.

Response filed Jan. 26, 2015 to Final Office Action mailed on Oct. 22, 2014 from U.S. Appl. No. 13/429,232, 17 pages.

(56) References Cited

OTHER PUBLICATIONS

Response filed Jun. 3, 2015 to Non-Final Office Action mailed on Mar. 26, 2015 from U.S. Appl. No. 13/429,232, 18 pages.
Response filed Aug. 13, 2013 to Non-Final Office Action mailed on Jun. 6, 2013 from U.S. Appl. No. 12/720,503, 15 pages.
Response filed Mar. 3, 2014 to Final Office Action mailed on Dec. 24, 2013 from U.S. Appl. No. 12/720,503, 15 pages.
Response filed May 8, 2014 to Non-Final Office Action mailed on Mar. 28, 2014 from U.S. Appl. No. 12/720,503, 16 pages.
Response filed Mar. 27, 2015 to Final Office Action mailed on Jan. 9, 2015 from U.S. Appl. No. 12/720,503, 18 pages.
PCT International Preliminary Report on Patentability mailed on Sep. 11, 2012 from PCT Application No. PCT/US2011/026755, 6 pages.
Response filed Jan. 4, 2016 to the Final Office Action mailed on Jul. 7, 2015 from U.S. Appl. No. 13/429,232, 12 pages.
Non-Final Office Action mailed Sep. 24, 2015 from U.S. Appl. No. 12/720,503, 23 pages.
Third Office Action mailed Sep. 28, 2015 from China Patent Application No. 201180012983.5, 13 pages.
"ArcPad StreetMap: Street-Level Data, Geocoding, and Routing for Mobile Systems", <http://www.infograph.com/jo.resources/product/ArcPad/arcpad-streetmap_mobilesystems.pdf> Dec. 2003, 14 pages.
"Metaballs," Feb. 27, 2009, retrieved at <<http://en.wikipedia.org/wiki/Metaballs>> on Nov. 14, 2015, 2 pages.
"VidaOne GPS Pocket PC User's Guide", <<http://www.vidaone.com/download/VdaGPS.pdf>>, Jan. 2007, 22 pages.
"Working with Pushpin Layers", <<http://msdn2.microsoft.com/en-us/library/aa972905.aspx>>, retrieved on Aug. 21, 2007, 3 pages.
Boutin et al., "Focus Dependent Multi-level Graph Clustering", Proceedings of AVI2004, May 25-28, 2004, 4 pages.
Collins et al., "Bubble Sets: Revealing Set Relations with Isocontours over Existing Visualizations," Feb. 12, 2010, retrieved at <<http://www.cs.toronto.edu/~ccollins/research/bubblesets/index.html>> on Nov. 14, 2015, 2 pages.
Varhol, Peter, "Mashing Up Using Virtual Earth", Sep. 15, 2006, retrieved at <<http://serl.cs.colorado.edu/~dennis/cs7818f06/MashingUpUsingVirtualEarth.pdf>> on Oct. 3, 2006, 6 pages.
Watanabe et al., "Bubble Clusters: An Interface for Manipulating Spatial Aggregation of Graphical Objects," Aug. 21, 2009, retrieved at <<http://www-ui.is.s.u-tokyo.ac.jp/~takeo/research/bubble/index.html>> on Nov. 14, 2015, 1 page.
Whitmore, Stephen, "Exploring Metaballs and Isosurfaces in 2D," Jun. 26, 2009, retrieved at <<http://www.gamedev.net/reference/programming/features/isometa2d/>> on Nov. 14, 2015, 3 pages.
Xu et al., "Active Contours, Deformable Models, and Gradient Vector Flow," Image Analysis and Communications Lab, Dec. 17, 2009, retrieved at <<http://iacl.ece.jhu.edu/projects/gvf/>> on Nov. 14, 2015, 7 pages.
Final Office Action mailed on Jul. 7, 2015 from U.S. Appl. No. 13/429,232, 24 pages.
Applicant Initiated Interview Summary and Office Action Appendix mailed Nov. 12, 2015 from U.S. Appl. No. 13/429,232, 5 pages.
Non-Final Office Action mailed on Jun. 5, 2008 from U.S. Appl. No. 11/280,635, 15 pages.
Examiner-Initiated Interview Summary mailed on Jul. 16, 2008 from U.S. Appl. No. 11/280,635, 4 pages.
Response filed on Jul. 22, 2008 to Non-Final Office Action mailed on Jun. 5, 2008 from U.S. Appl. No. 11/280,635, 9 pages.
Final Office Action mailed on Oct. 17, 2008 from U.S. Appl. No. 11/280,635, 11 pages.
Response filed Nov. 24, 2008 to Final Office Action mailed on Oct. 17, 2008 from U.S. Appl. No. 11/280,635, 8 pages.
Notice of Allowance mailed on Dec. 10, 2008 from U.S. Appl. No. 11/280,635, 8 pages.
Non-Final Office Action mailed on Sep. 24, 2015 from U.S. Appl. No. 12/720,503, 23 pages.
Response filed Dec. 14, 2014 to First Office Action mailed Jul. 30, 2014 from China Patent Application No. 201180012983.5, 16 pages.
Response filed May 29, 2015 to Second Office Action mailed on Mar. 19, 2015 from China Patent Application No. 201180012983.5, 11 pages.
Non-Final Office Action mailed on Mar. 1, 2012 from U.S. Appl. No. 11/930,367, 26 pages.
Response filed on Jul. 2, 2012 to Non-Final Office Action mailed on Mar. 1, 2012 from U.S. Appl. No. 11/930,367, 16 pages.
Notice of Allowance and Examiner-Initiated Interview Summary mailed on Sep. 19, 2012 from U.S. Appl. No. 11/930,367, 11 pages.
Response filed Dec. 14, 2015 to the Third Office Action mailed Sep. 28, 2015 from China Patent Application No. 201180012983.5, pages.
Decision on Rejection mailed Jan. 7, 2016 from China Patent Application No. 201180012983.5, 10 pages.
Applicant Initiated Interview Summary mailed Feb. 1, 2016 from U.S. Appl. No. 12/720,503, 3 pages.
Response filed Jan. 22, 2016 to Non-Final Office Action mailed Sep. 24, 2015 from U.S. Appl. No. 12/720,503, 13 pages.
Final Office Action mailed Apr. 8, 2016 from U.S. Appl. No. 12/720,503, 50 pages.
Notice of Allowance mailed Apr. 6, 2016 from U.S. Appl. No. 13/429,232, 27 pages.
Response filed Apr. 20, 2016 to the Decision on Rejection mailed Jan. 7, 2016 from China Patent Application No. 201180012983.5, 9 pages.
Applicant-Initiated Interview Summary mailed Jun. 6, 2016 from U.S. Appl. No. 12/720,503, 3 pages.
Response and After Final Consideration Pilot Program Request filed Jul. 13, 2016 to the Final Office Action mailed Apr. 8, 2016 from U.S. Appl. No. 12/720,503, 15 pages.
Advisory Action, Applicant-Initiated Interview Summary and After Final Consideration Program Decision mailed Aug. 12, 2016 from U.S. Appl. No. 12/720,503, 6 pages.
Corrected Notice of Allowability mailed Oct. 6, 2016 from U.S. Appl. No. 13/429,232, 20 pages.
Applicant-Initiated Interview Summary mailed Jun. 20, 2012 from U.S. Appl. No. 11/930,367, 4 pages.
Corrected Notice of Allowability mailed Nov. 25, 2016 from U.S. Appl. No. 13/429,232, 6 pages.
Corrected Notice of Allowability mailed Dec. 30, 2016 from U.S. Appl. No. 13/429,232, 6 pages.
Response filed Oct. 14, 2016 to the Notification of Reexamination mailed Aug. 31, 2016 from Chinese Patent Application No. 201180012983.5, 12 pages.

\* cited by examiner

INTERACTIVE REPRESENTATION OF CLUSTERS OF GEOGRAPHICAL ENTITIES

BACKGROUND

Geo-located data is data or information that is associated with a geographic location. Examples of such data or information can include yellow page listings for businesses, demographic data, encyclopedic data in digital repositories, individual status reports such as those generated from GPS-enabled mobile devices, annotated imagery from various repositories, and geo-located entities extracted from some Web-accessible resource, to name just a few.

One way of representing geo-located data is to visually render a small visual entity on the surface of a map, such as a map that is rendered on a computing device. For example, a user may perform an online search requesting the location of the nearest coffee houses. Responsive to the user's search, a map or other information can be returned to the user's computing device so that a map can be rendered to include various visual entities that represent the location of the coffee houses. As an example, consider FIG. 1. There, an example map is shown generally at 100. Map 100 includes two collections of visual entities designated at 102, 104. In this particular example, the visual entities reside in the form of a rendered push pin.

As the number of visual entities increases to reflect the presence of more and more geo-located data, so too does the incidence of overlap between the visual entities. For example, notice that in collections 102, 104, a number of different visual entities overlap. This can be problematic for a user who desires to interact with a particular visual entity. For example, if the user wishes to click on a partially occluded visual entity, it may be difficult to do so. In some instances, visual entities may be totally occluded, thus making user interaction impossible. Furthermore, a dense geo-located data set can be problematic because it can overlap with other dense data sets and, as a result, a straightforward rendering might further hide information on the map, make different data sets difficult to visually separate, and ultimately might occlude information, such as map legends.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable, in a mapping context, various visual entities to be clustered into groups that do not occlude one another. In at least some embodiments, individual clusters are represented on a map by a puddle defined by a computed contour line. Users can interact with the puddle to acquire more information about the puddle's content. In at least some embodiments, user interaction can include zooming operations, clicking operations, hovering operations and the like.

In at least some embodiments, the various visual entities can be re-clustered responsive to user interaction. Re-clustering can, in at least some embodiments, include a transition animation that provides a logical visual link between a pre-transition puddle and one or more post-transition puddles.

BRIEF DESCRIPTION OF THE DRAWINGS

The same numbers are used throughout the drawings to reference like features.

DETAILED DESCRIPTION

Overview

Various embodiments enable, in a mapping context, various visual entities to be clustered into groups that do not occlude one another. In at least some embodiments, individual clusters are represented on a map by a puddle defined by a computed contour line. Users can interact with the puddle to acquire more information about the puddle's content. In at least some embodiments, user interaction can include zooming operations, clicking operations, hovering operations and the like.

In at least some embodiments, the various visual entities can be re-clustered responsive to user interaction. For example, responsive to a zoom-in or a zoom-out operation, the visual entities can be re-clustered and one or more new puddles can be computed and rendered. Re-clustering can, in at least some embodiments, include a transition animation that provides a logical visual link between a pre-transition puddle and one or more post-transition puddles.

In the discussion that follows, a section entitled "Operating Environment" is provided and describes one environment in which one or more embodiments can be employed. Following this, a section entitled "Constructing Puddles" describes how puddles can be constructed in accordance with one or more embodiments. Next, a section entitled "Interacting with Puddles" describes how a user can interact with a puddle in accordance with one or more embodiments. Following this, a section entitled "Puddle/Cluster Transition" describes how transitions can be effectuated in accordance with one or more embodiments. Last, a section entitled "Example System" describes an example system that can be utilized to implement one or more embodiments.

Consider now an example operating environment in which one or more embodiments can be implemented.

Operating Environment

Figure 2:
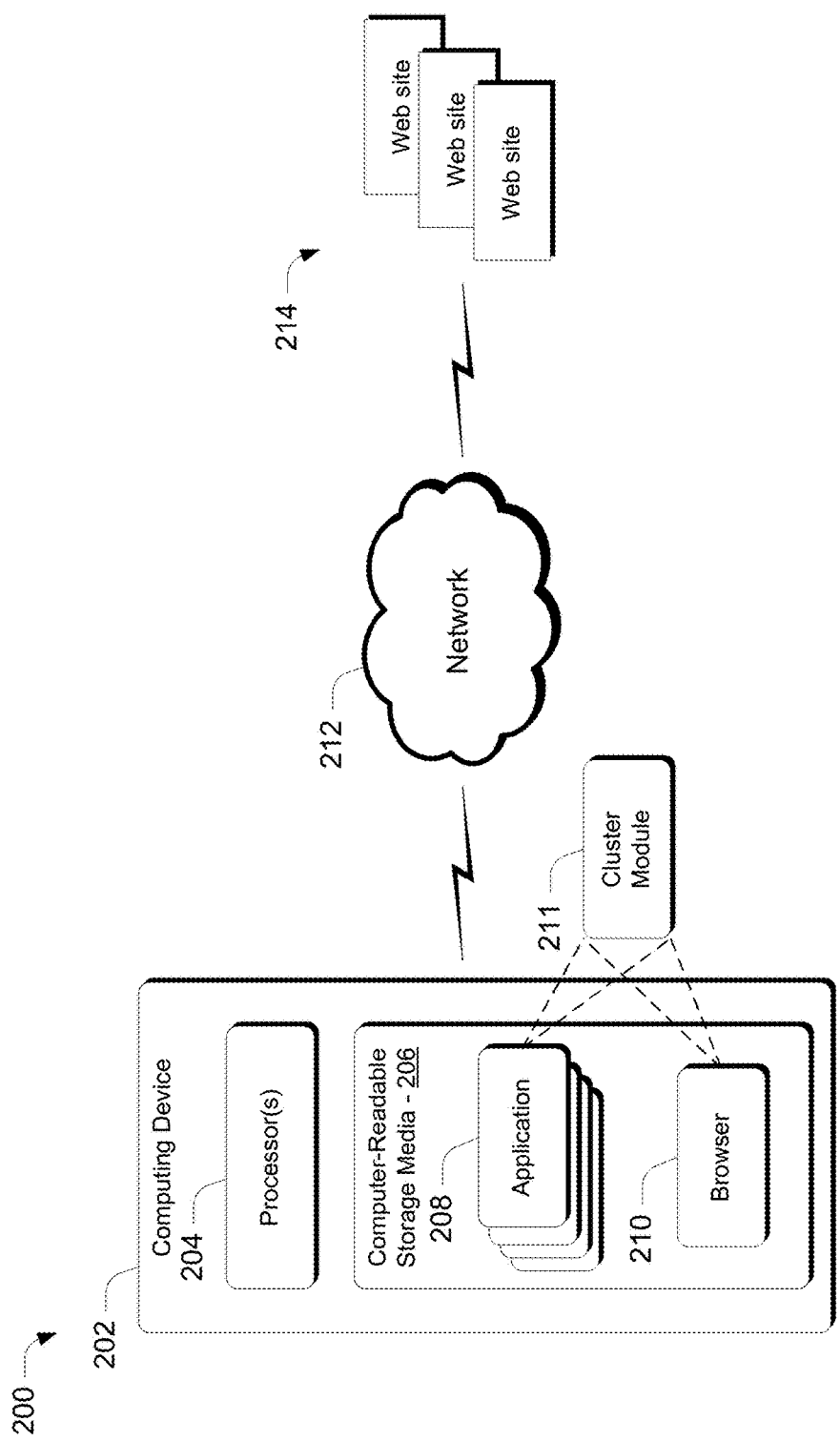
FIG. 2 illustrates an operating environment in which various principles described herein can be employed in accordance with one or more embodiments.

FIG. 2 illustrates an operating environment in accordance with one or more embodiments, generally at 200. Environment 200 includes a computing device 202 having one or more processors 204, one or more computer-readable storage media 206 and one or more applications 208 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 14.

In addition, computing device 202 includes a software application in the form of a web browser 210. Any suitable web browser can be used examples of which are available from the assignee of this document and others. In addition, computer-readable storage media 206 can include a cluster module 211 that operates as described above and below. Cluster module 211 can be implemented as a standalone component that can be utilized by applications 208 and browser 210. Alternately or additionally, the cluster module 211 can be implemented as part of applications 208 and/or browser 210.

In operation, cluster module 211 works in a mapping context to enable various visual entities, such as push pins, bubbles and the like, to be clustered into groups that do not occlude one another. The cluster module can do this by representing individual clusters by a puddle defined by a computed contour line. Users can interact with the puddle to acquire more information about the puddle's content. For example, a user can zoom, click, and/or hover relative to a cluster or puddle and the cluster module 211 can provide additional information that pertains to the cluster. Part of this additional information can include re-clustering the visual entities responsive to the user's interaction, as described below in more detail.

In addition, environment 200 includes a network 212, such as the Internet, and one or more web sites 214 from and to which content can be received and sent. Such content can include map content that can be operated upon by cluster module 211, as described above and below. It is to be appreciated and understood that the cluster module can reside on a server or network-accessible computer, other than computing device 202.

Computing device 202 can be embodied as any suitable computing device such as, by way of example and not limitation, a desktop computer, a portable computer, a handheld computer such as a personal digital assistant (PDA), cell phone, and the like.

Having described an example operating environment, consider now a discussion of how puddles can be constructed in accordance with one or more embodiments.

Constructing Puddles

In one or more embodiments, puddles are constructed using a two-stage process. The first stage computes clusters that are defined by groups of visual entities such as push pins, bubbles, and the like. The second stage then computes a visual representation or puddle for each cluster.

Figure 1:
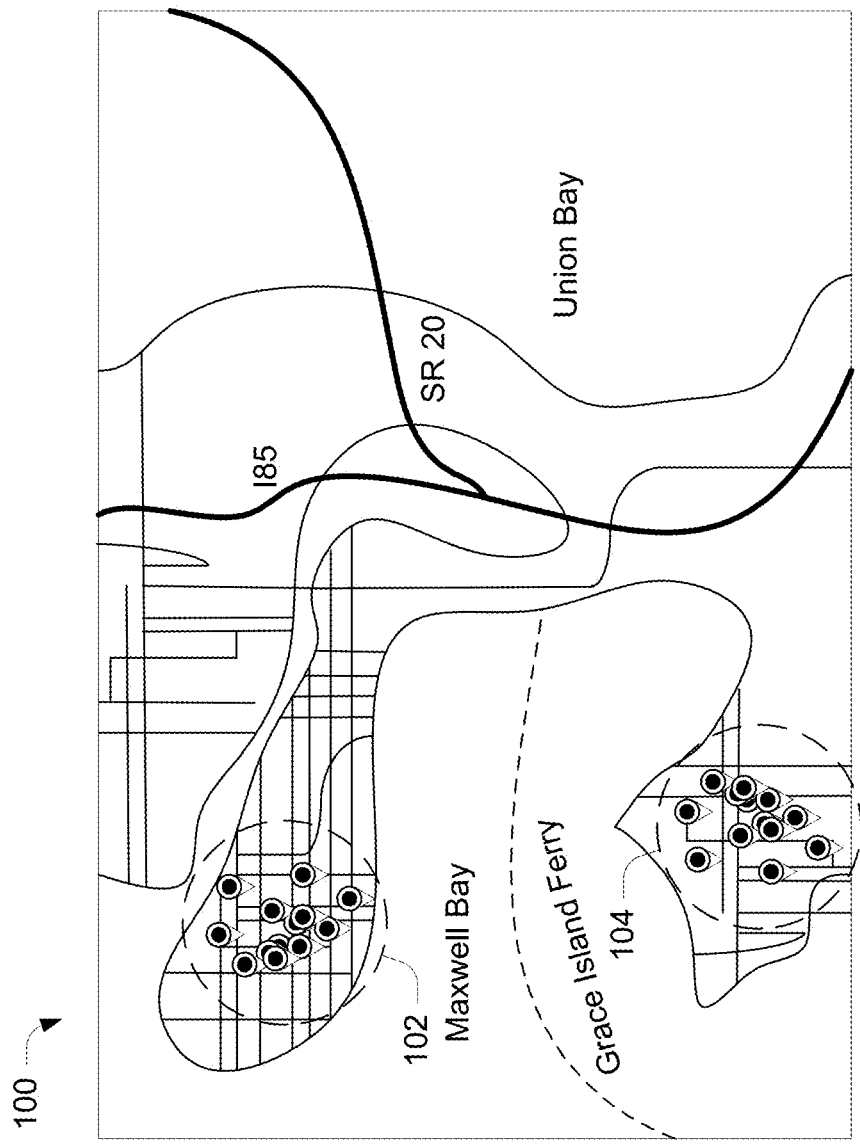
FIG. 1 illustrates a map that is useful in understanding various principles described herein.
Figure 3:
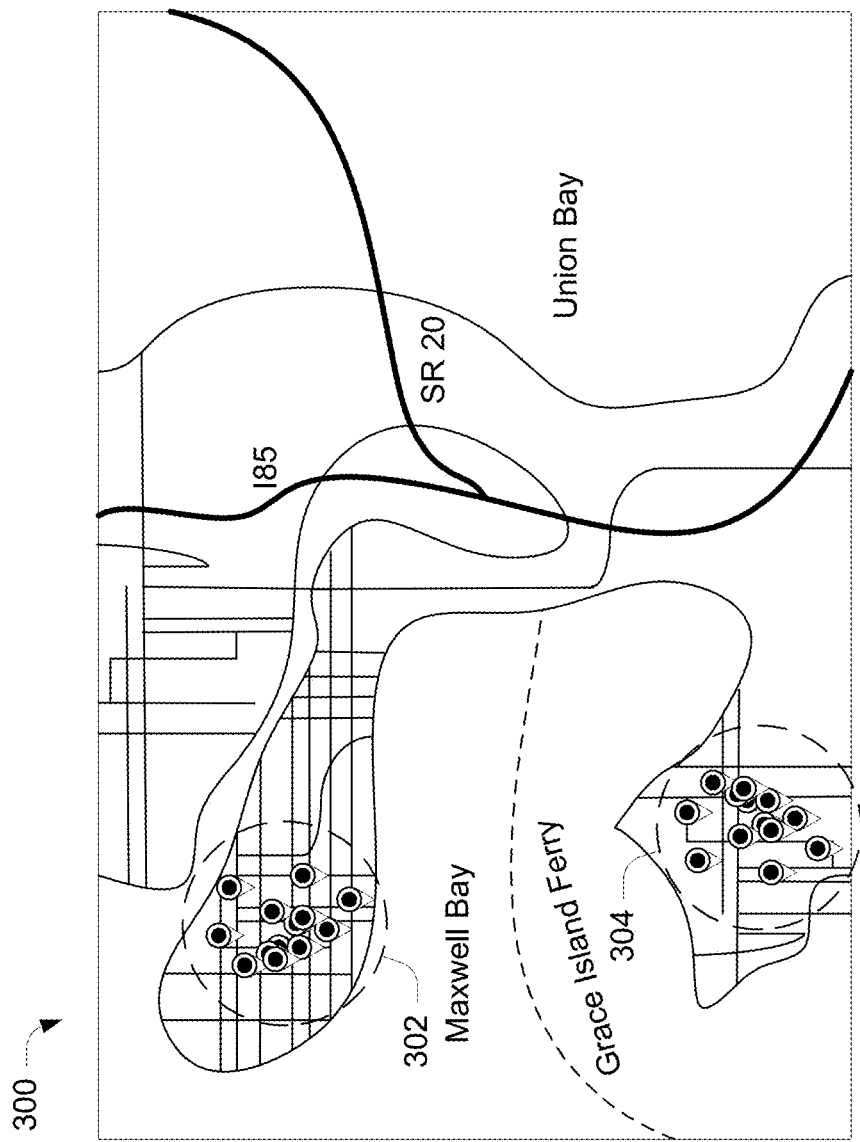
FIG. 3 illustrates a map that is useful in understanding various principles described herein.

Consider now the first stage. Assume that a user has entered a search query, relative to a map, that would return a number of different visual entities that would be rendered on the map. As an example, consider FIG. 3 (which is identical to FIG. 1). There, a map 300 includes two collections of entities 302, 304 that would typically have been rendered responsive to a user's search query.

Computation of clusters in the first stage can be performed, in at least some embodiments, by taking into account the dimensions of the individual visual entities, e.g., the push pins, as well as the distance between the visual entities. In at least some embodiments, visual entities that are determined to overlap are grouped into one cluster. For example, the visual entities might overlap if the distance between the visual entities is less than a particular dimension of the visual entity. This computation can be performed in any suitable way. As but one example of how this computation can be performed, consider the following.

Assume that s is the size of a visual entity in screen coordinates. For example, s may represent the diameter, in pixels, of a push pin. Assume also that ds represents the distance represented by s in the map coordinates at the map's current scale. Collections of clusters can be computed using the algorithm described in the following pseudo-code:

```
collection_of_clusters = empty set
foreach (entity in set_of_entities) {
    c = new_cluster(entity)
    cluster = cluster in collection_of_clusters
        s.t. is closest to c and
        distance(entity, cluster) < ds
    if (cluster is null)
    {
        collection_of_clusters.add(c)
    } else {
        cluster.merge(c)
    }
}
```

At the end of this algorithm's run, a collection of clusters is produced. In at least some embodiments, computation speed of the algorithm can be enhanced in the following ways. First, a new visual entity is merged into a single cluster and not multiple clusters. Merging to a single cluster can significantly improve performance of the algorithm by reducing the number of distance computations the algorithm has to perform. Second, each cluster is made up of two sets of visual entities: a set of core entities that define the cluster's basic shape, and a set of redundant entities that do not significantly change the constitution or form of the cluster. These two sets of visual entities are used to improve both the merge and distance testing operations associated with a cluster. In at least one embodiment, each cluster maintains a bounding box structure that is updated each time a visual entity is added to or removed from a cluster. The following pseudo-code describes how data structures can be used to simplify cluster tests and operations:

```
function cluster:merge(new_cluster) {
    // new cluster has only one entity (as determined by the
    // previous algorithm
        new_entity = new_cluster.entities[0];
        bool redundant = false;
        foreach (entity in this.entities) {
            if (new_cluster.bounding_box.contains(entity))
            {
                redundant = true;
                break;
            }
        }
        if (redundant)
        {
            this.redundant_set.add(new_entity);
```

```
    }
    else
    {
        this.core_set.add(entity)
        this.bounding_box.update(entity)
    }
}
function distance(entity, cluster) {
    closest_entity = e in cluster.core_set
        s.t. is closest to entity
    return distance(entity, closest_entity)
}
```

Now that the individual clusters have been computed, consider now the second stage which computes a visual representation or puddle for each of the clusters.

Figure 4:
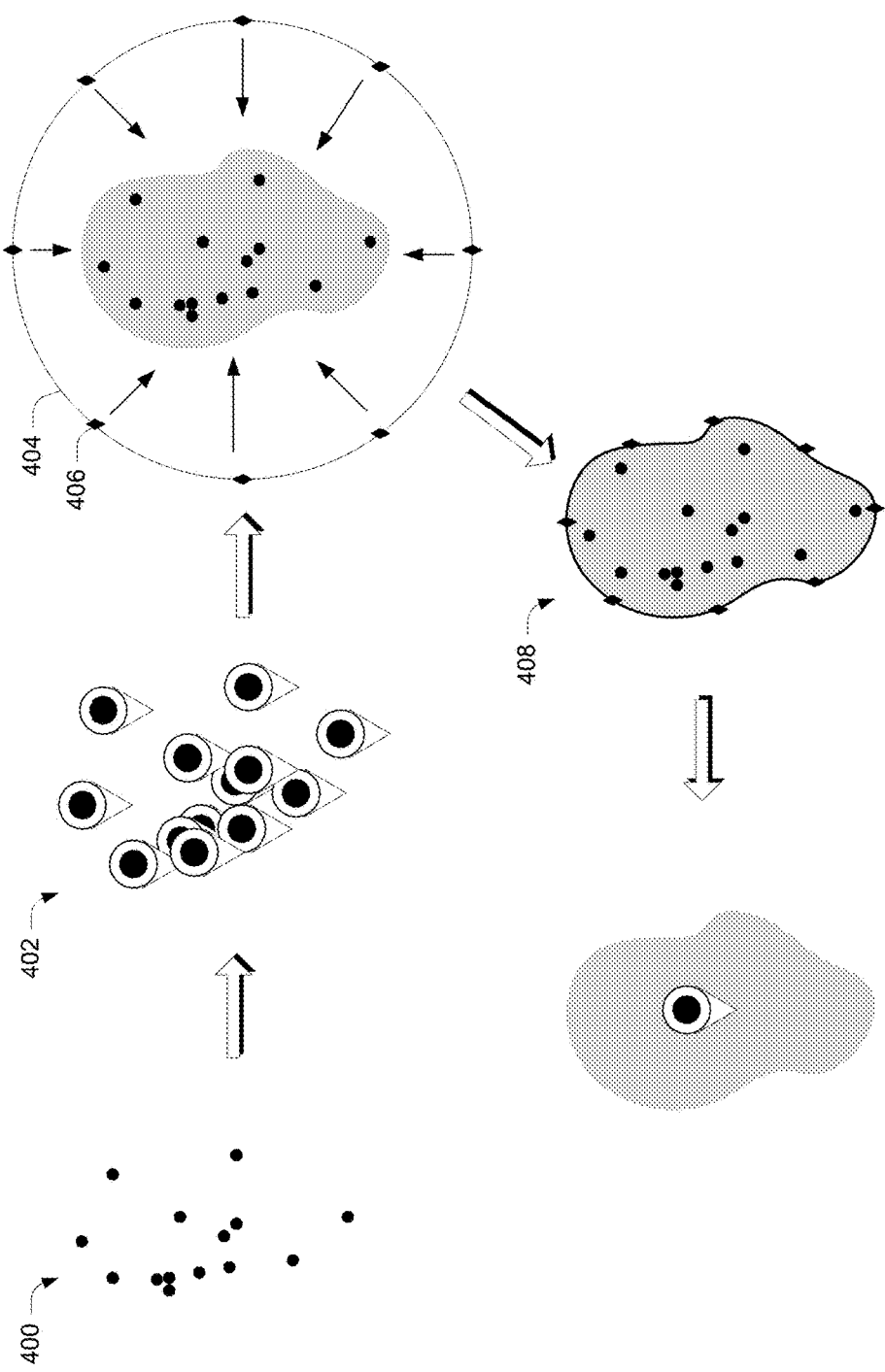
FIG. 4 illustrates how a puddle can be computed in accordance with one or more embodiments.

In at least some embodiments, a puddle is computed for a cluster by computing a contour line that defines the outer perimeter of the puddle and contains the visual entities associated with that particular cluster. Any suitable algorithm can be used to compute the contour line. In at least some embodiments, a bounding structure or box can be used to facilitate computation of the contour line. As but one example of how this can be done, consider FIG. 4. There, a collection of vertices is shown generally at 400. These vertices are points that correspond to individual visual entities shown generally at 402. To compute a contour line, a bounding structure or box 404 is defined to enclose the collection of vertices 400. Each vertex has an associated energy field that defines a certain magnitude value in 2D space. The energy for a vertex field peaks at the vertex's location and decays as one moves away from a vertex's location. The decay can occur using any suitable decaying function, e.g. quadratic and the like. The bounding structure or box also includes a number of nodes or vertices some of which are shown at 406. In at least some embodiments, the number of nodes or vertices of the bounding structure is directly proportional to the perimeter of a cluster's bounding box. The nodes or vertices of the bounding structure or box 404 are iteratively moved closer to a border where the collective energy field has a determined value to ultimately define a puddle such as that shown at 408.

As but one example of how the above-described puddle can be defined, consider the following pseudo-code:

```
function cluster:compute_contour(field_value, vertices)
{
    countour = list of vertices defining the smallest circle including the cluster's bounding box
    foreach (vertex in contour) {
        repeat {
            value = field value at vertex's location
            move vertex towards cluster's centre of mass
        } until (value >= field_value)
    }
}
```

In the above pseudo-code, the "centre of mass" is only one of a potential number of "targets" that can be used. For example, one can follow different and/or computationally more expensive strategies, such as "gradient descent," in which movement occurs in a direction where the energy field changes (e.g., increases in this case) the most. In one or more embodiments, the collection of vertices 400 can be visually removed from puddle 408. Additionally, a single visual entity can be rendered on top of the puddle to provide a visual indication of the puddle's content, as at 410.

Figure 5:
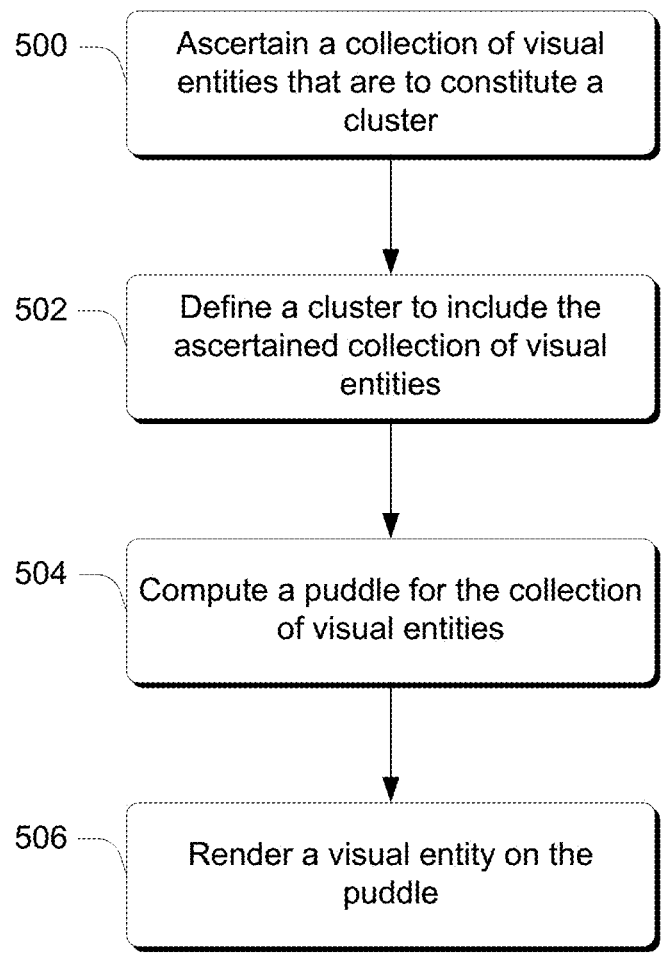
FIG. 5 is a flow diagram that describes steps in a method in accordance with one or more embodiments.

FIG. 5 is a flow diagram that describes steps in a method in accordance with one or more embodiments. The method can be implemented in connection with any suitable hardware, software, firmware or combination thereof. In at least some embodiments, aspects of the method can be implemented by a software module, such as cluster module 211 (FIG. 2). It is to be appreciated and understood that the method can be performed by a suitably-configured server or network-accessible computing device, with results then being sent to a client computing device.

Step 500 ascertains a collection of visual entities that are to constitute a cluster. This step can be performed in any suitable way. For example, in at least some embodiments, visual entities that are found to overlap or occlude one another can constitute a portion of the collection of visual entities. Step 502 defines a cluster to include the ascertained collection of visual entities. Step 504 computes a puddle for the collection of visual entities. This step can be performed in any suitable way. For example, in at least some embodiments, this step can be performed by using a bounding box structure and associated energy field calculations, as described above. It is to be appreciated and understood, however, that any suitable technique for computing a puddle can be utilized without departing from the claimed subject matter. This step can also include displaying or rendering the puddle on the map. Step 506 renders a visual entity on the puddle. This step can be an optional step. An example of how this can be done is provided above.

Having described how puddles can be constructed in accordance with one or more embodiments, consider now various embodiments that illustrate how a user can interact with a puddle.

Interacting with Puddles

Figure 6:
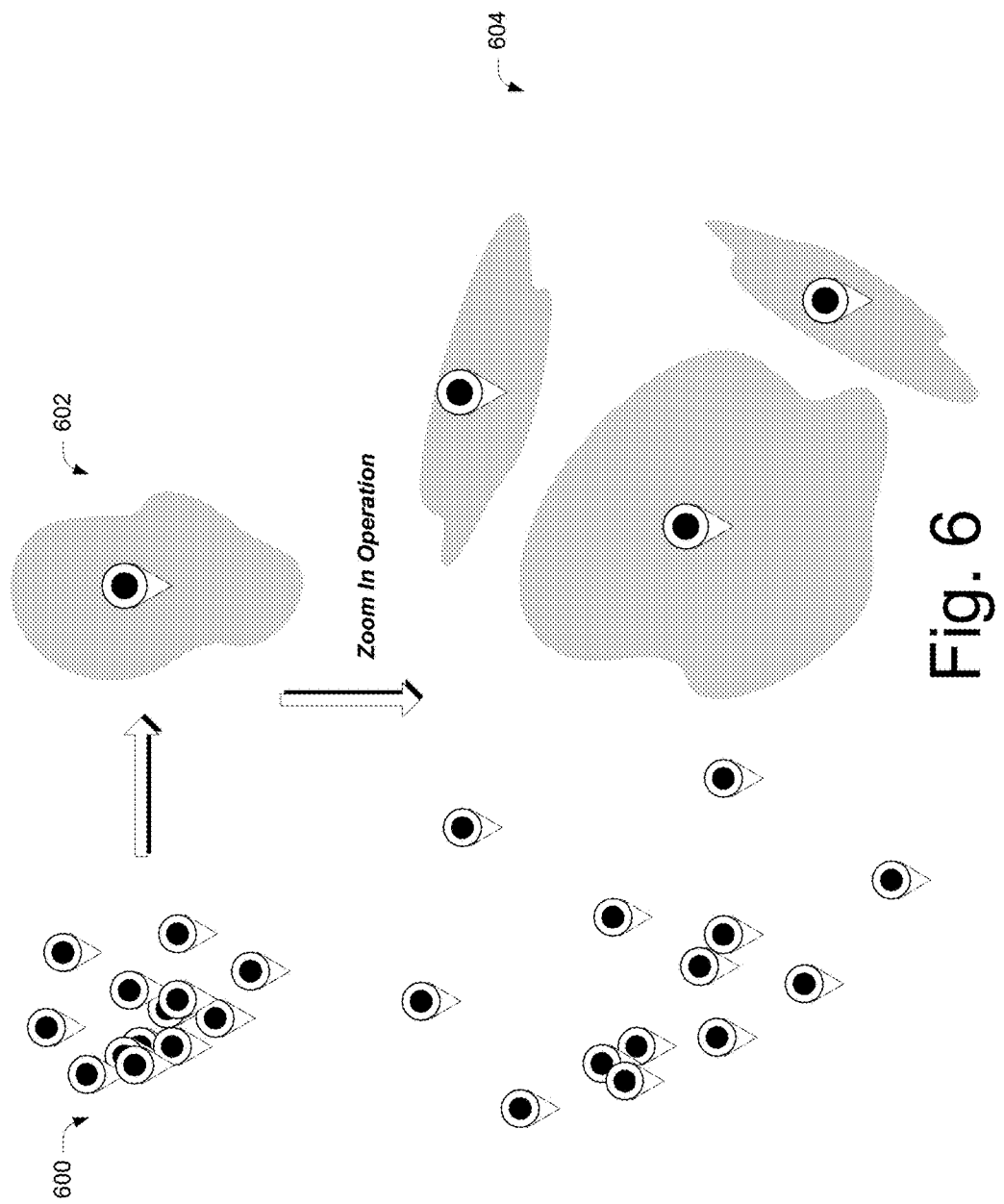
FIG. 6 illustrates aspects of a zoom operation in accordance with one or more embodiments.

In at least some embodiments, the various visual entities can be re-clustered responsive to user interaction. For example, responsive to a zoom-in or a zoom-out operation, the visual entities can be re-clustered and one or more new puddles can be computed and rendered. As an example, consider FIG. 6. There, a collection of visual entities 600 has a corresponding puddle 602. However, when a user zooms into the map associated with the visual entities, the spatial relationship between the visual entities changes because of the change in scale of the map. Consequently, the collection of visual entities 600 has been re-clustered to define a number of different puddles shown generally at 604. Re-clustering the collection of visual entities can be performed as described above in the discussion describing puddle construction. For the sake of brevity, that discussion is not repeated here.

Figure 7:
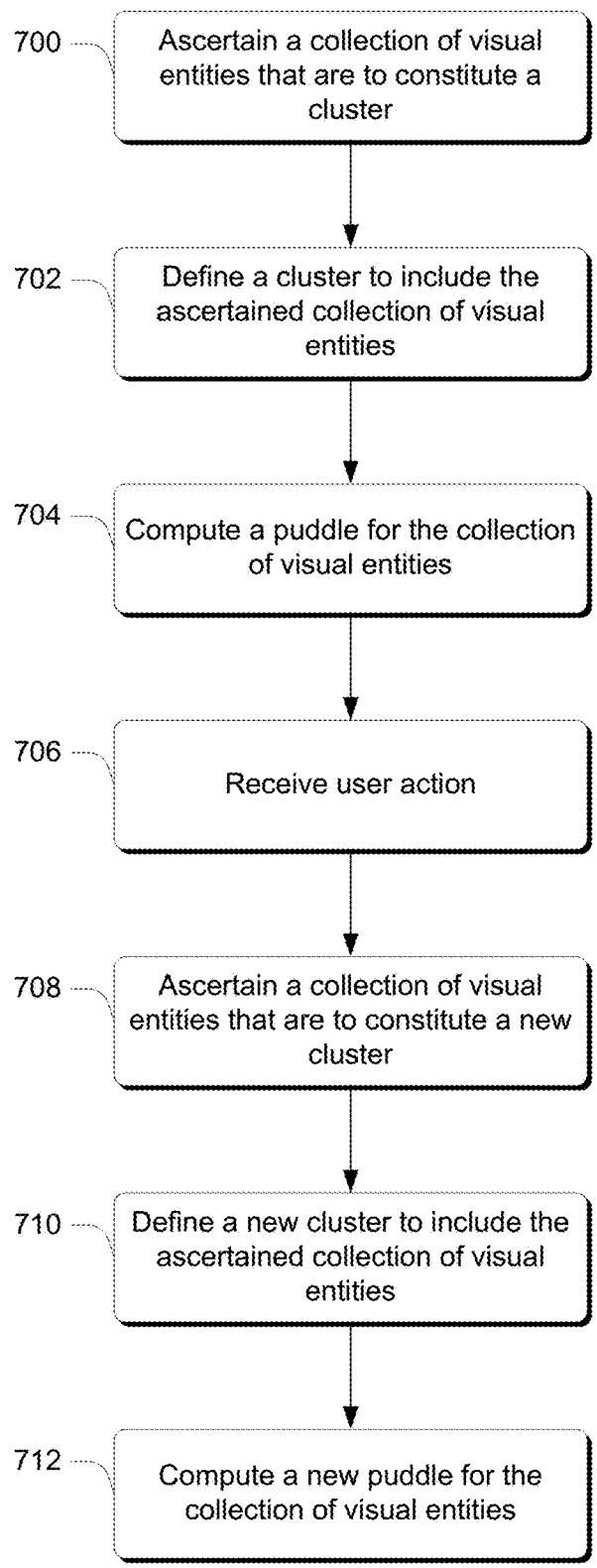
FIG. 7 is a flow diagram that describes steps in a method in accordance with one or more embodiments.

FIG. 7 is a flow diagram that describes steps in a method in accordance with one or more embodiments. The method can be implemented in connection with any suitable hardware, software, firmware or combination thereof. In at least some embodiments, aspects of the method can be implemented by a software module, such as cluster module 211 (FIG. 2). It is to be appreciated and understood that the method can be performed by a suitably-configured server or network-accessible computing device, with results then being sent to a client computing device.

Step 700 ascertains a collection of visual entities that are to constitute a cluster. This step can be performed in any suitable way. For example, in at least some embodiments, visual entities that are found to overlap or occlude one another can constitute a portion of the collection of visual entities. Step 702 defines a cluster to include the ascertained collection of visual entities. Step 704 computes a puddle for the collection of visual entities. This step can be performed in any suitable way. For example, in at least some embodiments, this step can be performed by using a bounding box structure and associated energy field calculations, as described above. It is to be appreciated and understood, however, that any suitable technique for computing a puddle can be utilized without departing from the claimed subject matter. This step can also include displaying or rendering the puddle on the map. Step 706 receives a user action. Any suitable type of user action can be received examples of which include a zoom-in operation and/or a zoom-out operation.

Responsive to receiving the user action, step 708 ascertains a new collection of visual entities that are to constitute a new cluster. Step 710 defines a new cluster to include the ascertained collection of visual entities. This step, as well as the others described above, can result in multiple clusters being defined. Step 712 computes a new puddle for each collection of visual entities that defines a new cluster. Examples of how this can be done are provided above. This step can also include displaying or rendering the new puddle on the map.

Figure 8:
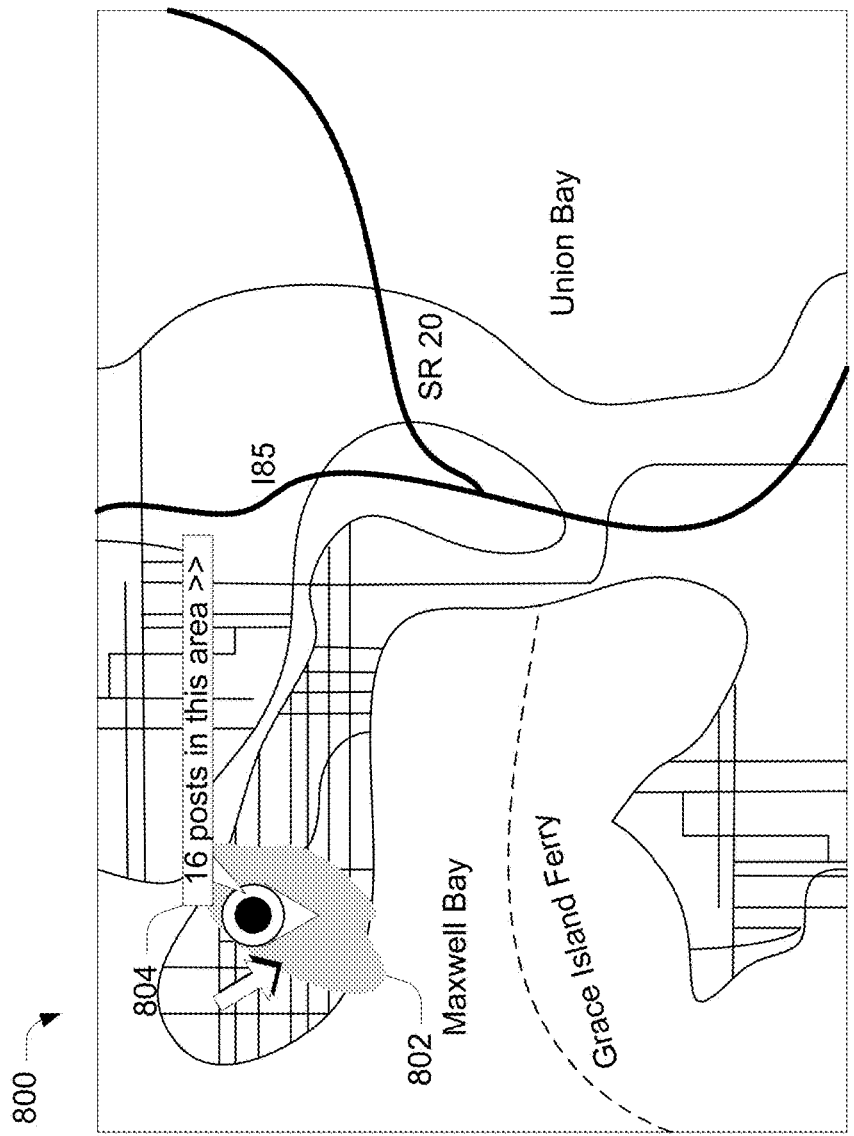
FIG. 8 illustrates aspects of a user interaction with a puddle in accordance with one or more embodiments.

In one or more embodiments, users can interact with puddles in other ways. For example, if a user clicks on or hovers over a puddle, additional information can be provided to the user. As an example, consider FIG. 8. There, a map 800 is shown with a single puddle 802. Notice that the user has hovered their cursor over the puddle. Responsive to this user action, a small preview 804 is provided to give the user additional information about the puddle.

Figure 9:
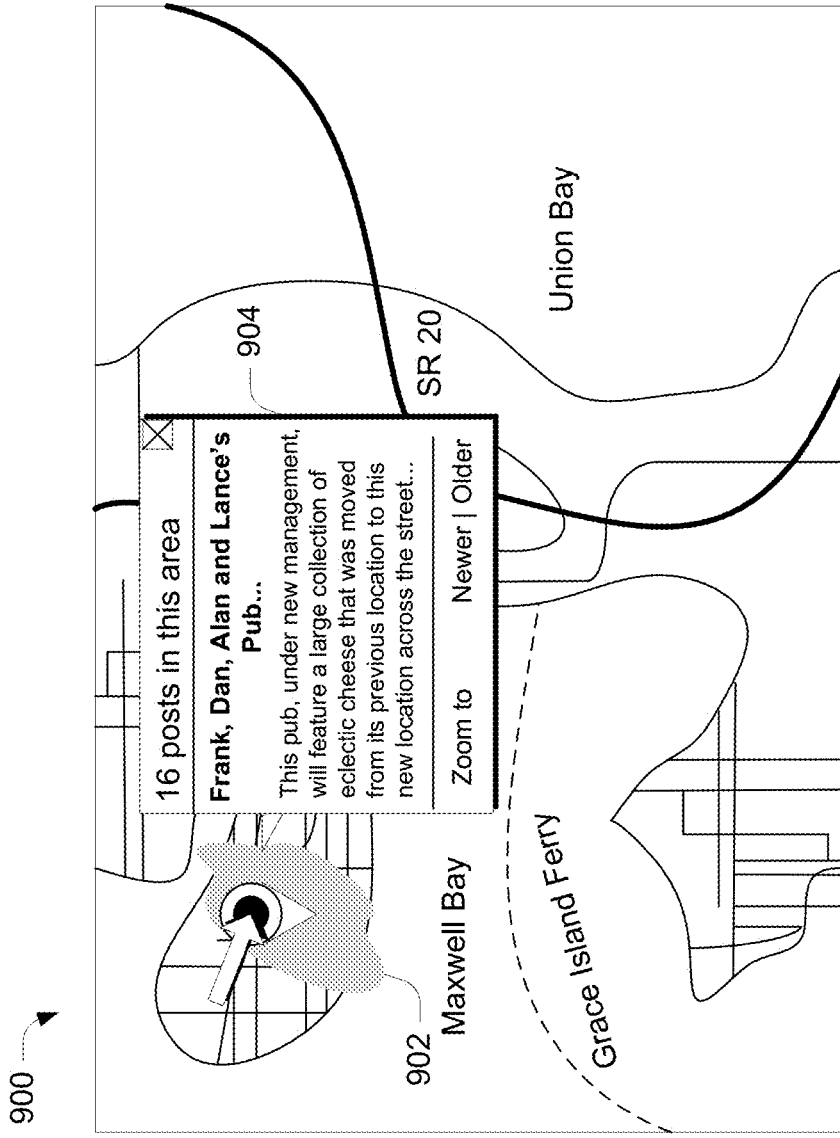
FIG. 9 illustrates aspects of a user interaction with a puddle in accordance with one or more embodiments.

As another example, consider FIG. 9. There, a map 900 is shown with a single puddle 902. In this instance, the user has clicked their cursor on the visual entity associated with the puddle. Responsive to this user action, a miniature browser window is rendered and includes information about the content of the puddle. Here, the information concerns a pub that is under new management. In addition, navigation instrumentalities are provided and allow the user to navigate to additional content associated with the puddle.

Figure 10:
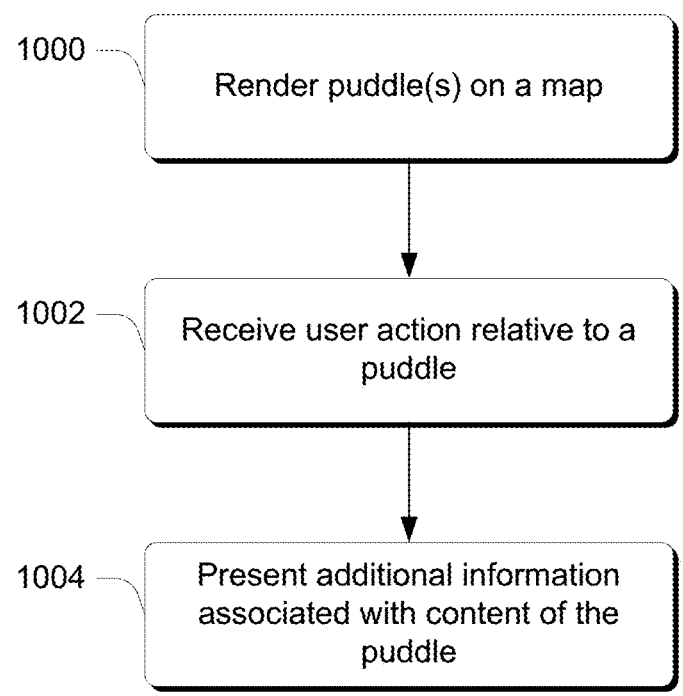
FIG. 10 is a flow diagram that describes steps in a method in accordance with one or more embodiments.

FIG. 10 is a flow diagram that describes steps in a method in accordance with one or more embodiments. The method can be implemented in connection with any suitable hardware, software, firmware or combination thereof. In at least some embodiments, aspects of the method can be implemented by a software module, such as cluster module 211 (FIG. 2). It is to be appreciated and understood that the method can be performed by a suitably-configured server or network-accessible computing device, with results then being sent to a client computing device.

Step 1000 renders one or more puddles on a map. Examples of how puddles can be constructed and rendered are provided above. Step 1002 receives a user action relative to one of the puddles. Examples of user actions are provided above and include, by way of example and not limitation, a cursor hover, a click and the like. Step 1004 presents additional information associated with content of the puddle. Examples of additional information are provided above.

Having discussed example puddle interactions, consider now a discussion of how transitions can be used to provide a logical visual connection when zoom operations are utilized.

Puddle/Cluster Transition

Figure 11:
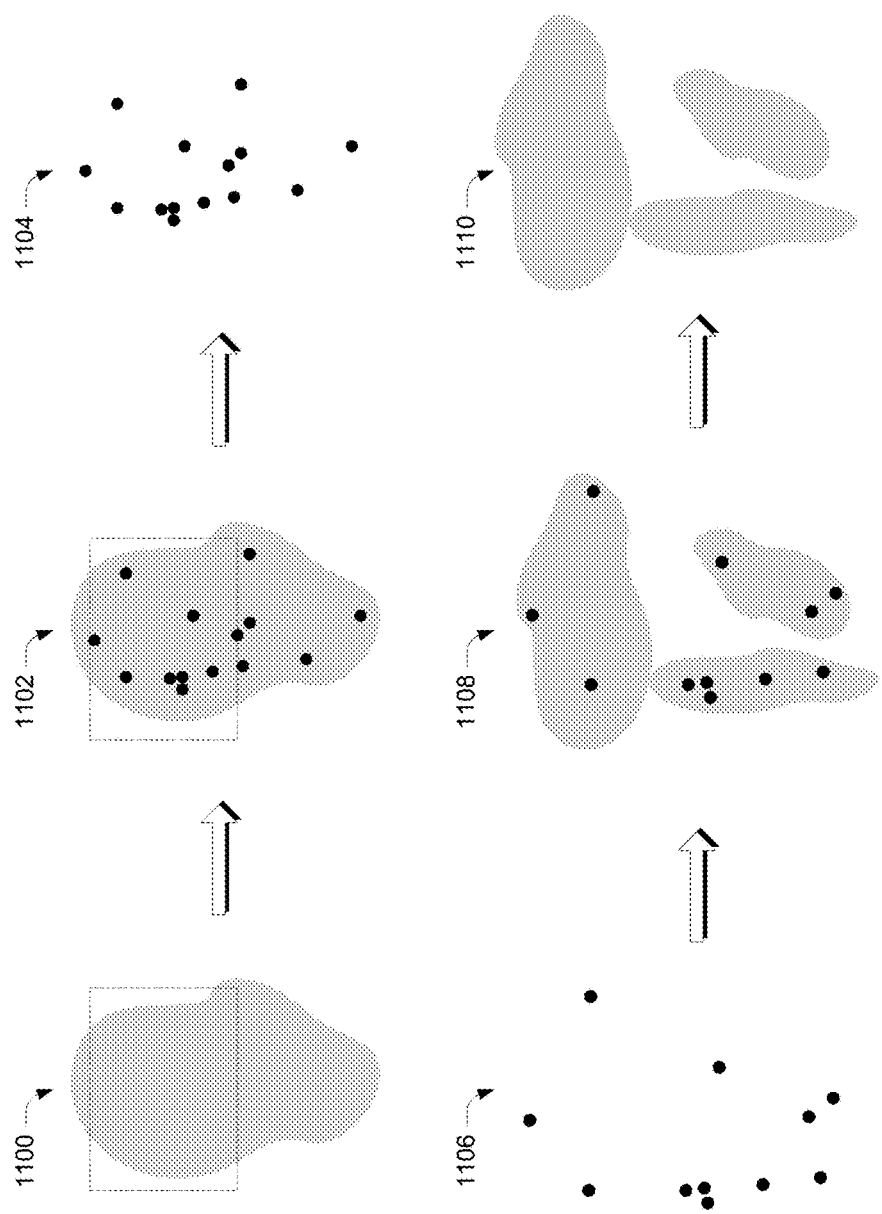
FIG. 11 illustrates a transition between puddles in accordance with one or more embodiments.

As discussed above, when a user zooms into or out of a map, a re-clustering operation takes place which can result in different puddle formations being computed. For example, zooming into a page can cause a cluster's associated puddle to subdivide into other different puddles. In at least some embodiments, a transition in the form of a visual rendering can provide a logical, visual connection between puddles at different zoom states. As an example, consider FIG. 11.

There, a transition associated with a zoom-in operation is serially presented. In this instance, assume that the user is viewing a map that includes puddle 1100. Assume now that the user clicks an instrumentality to affect a zoom-in operation with respect to the area shown by the dashed rectangle. Responsive to receiving the user's click, an associated collection of vertices or points are rendered in the puddle at 1102. These vertices or points correspond, individually, to visual entities associated with the puddle.

Next, the puddle is removed to leave only the collection of vertices or points at 1104. Next, the zoom operation is performed and results in an enlarged view of the collection of vertices or points at 1106. Now, a re-clustering operation is performed, as described above, to re-define clusters as a result of the zoom operation. In addition, puddles are recomputed based on the re-clustering operation. Both the recomputed puddles and their associated vertices or points are rendered at 1108. Finally, the collection of vertices or points is removed, leaving behind the newly-computed puddles at 1110.

Figure 12:
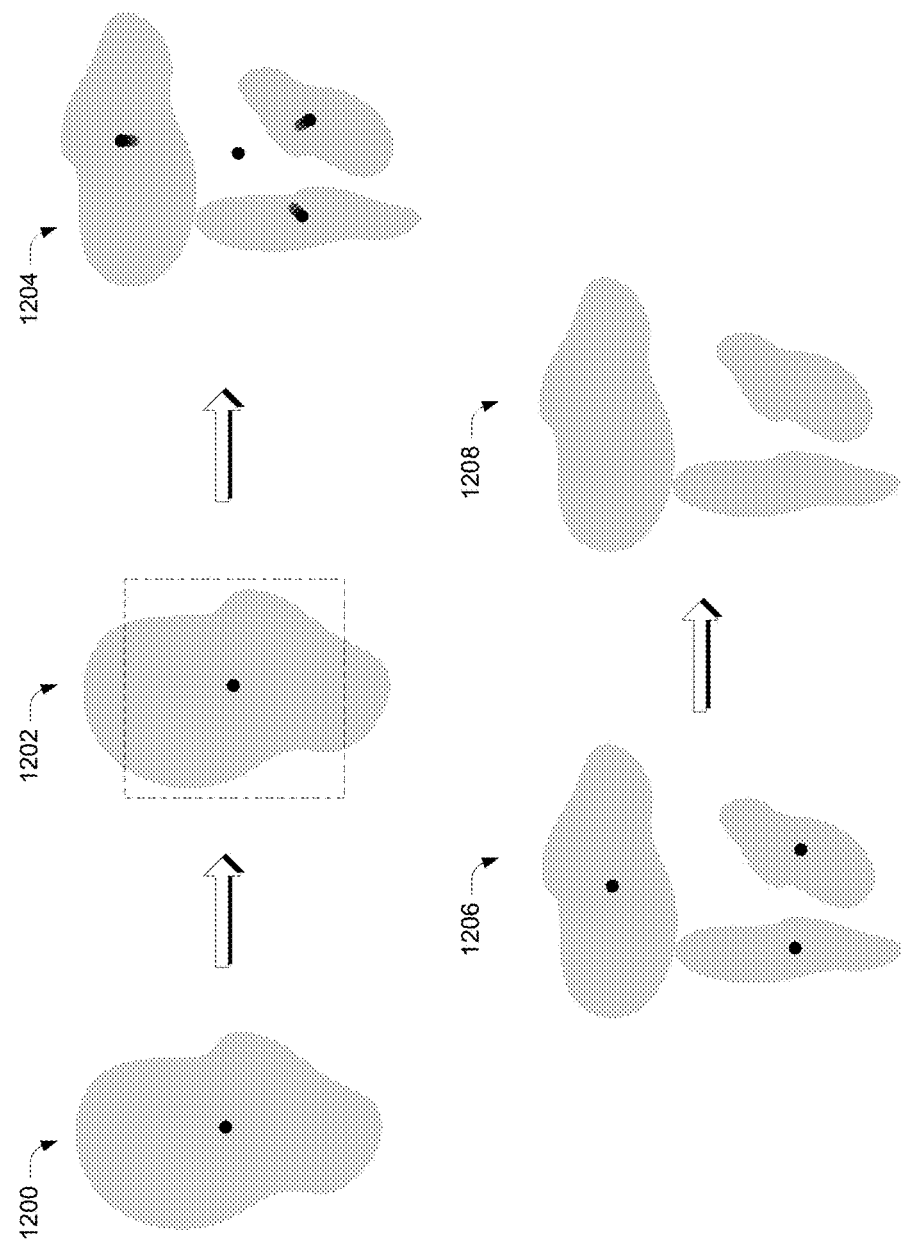
FIG. 12 illustrates a transition between puddles in accordance with one or more embodiments.

As another example, consider FIG. 12. There, a transition associated with a zoom-in operation is serially presented. In this instance, assume that the user is viewing a map that includes puddle 1200. Assume now that the user clicks an instrumentality to affect a zoom-in operation. In this instance, assume that the user clicked within the dashed box shown at 1202. Responsive to receiving the user's click, a zoom operation is performed which includes conducting a re-clustering operation as described above, as well as computing new puddles for re-clustered vertices or points. At this point, the re-computed puddles are rendered and the visual entity associated with the original puddle is rendered as well. This visual entity corresponds to the black dot that is shown amongst the recomputed puddles at 1204. In addition, visual entities for each of the new puddles are rendered and, in this instance, provide a visual indication of the direction from which the new puddle originated. Specifically, in this example, each of the visual entities inside a new puddle has a tail that fades towards the direction from which the new puddle originated. Here, that direction is toward the visual entity associated with the original puddle (i.e. the black dot).

Next, the faded tail for each new visual entity is removed at 1206 leaving only a new visual entity for each puddle. Following this, the visual entity for each puddle is removed, at 1208, leaving only the puddles behind.

In the event that a user action is a zoom-out operation and puddles merge to form a new puddle, a fading tail would be rendered and point toward each of the puddles that were merged into the new puddle.

Figure 13:
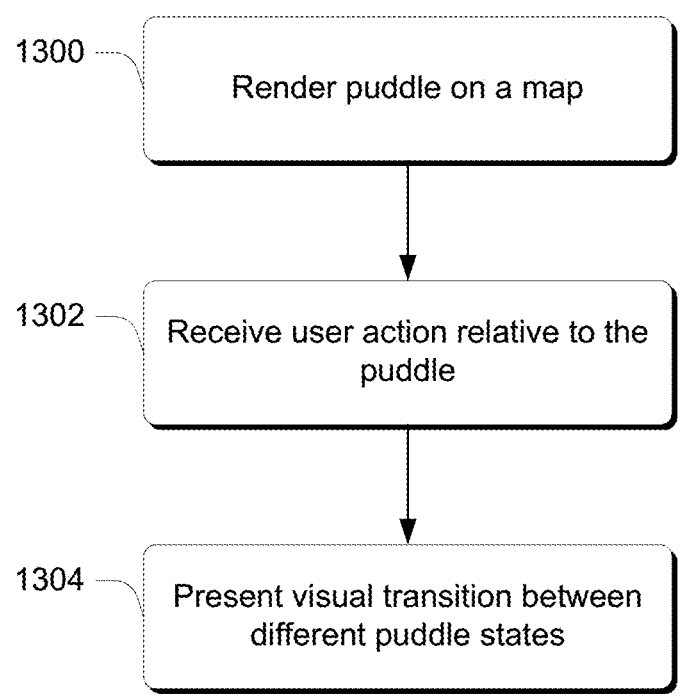
FIG. 13 is a flow diagram that describes steps in a method in accordance with one or more embodiments.

FIG. 13 is a flow diagram that describes steps in a method in accordance with one or more embodiments. The method can be implemented in connection with any suitable hardware, software, firmware or combination thereof. In at least some embodiments, aspects of the method can be implemented by a software module, such as cluster module 211 (FIG. 2).

Step 1300 renders a puddle on a map. Examples of how this can be done are provided above. Step 1302 receives a user action relative to the puddle. Any suitable user action can be received. In at least some embodiments, the user action comprises a zoom-in or a zoom-out operation. Step 1304 presents a visual transition between different puddle states that are caused by the user action. Examples of how this can be done are provided above.

Having described various embodiments of interactive representation of dense clusters of geographical entities, consider now an example system that can be utilized to implement one or more of the above-described embodiments.

Example System

Figure 14:
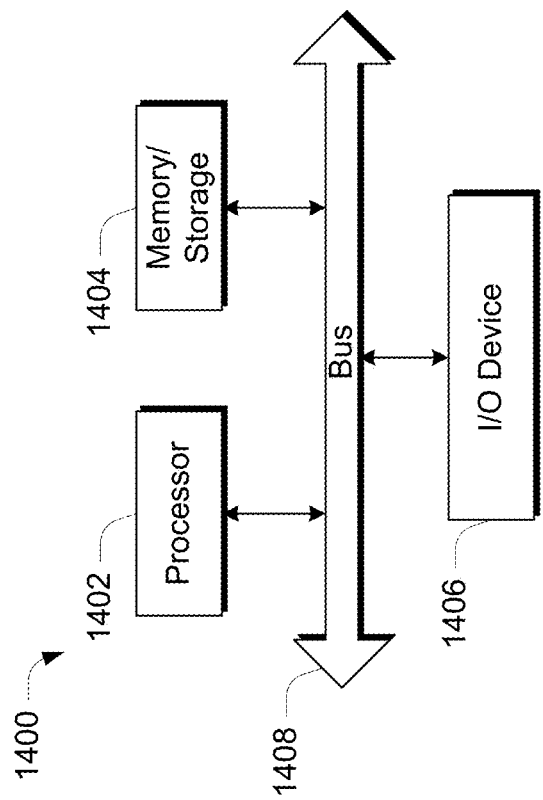
FIG. 14 illustrates an example system that can be used to implement one or more embodiments.

FIG. 14 illustrates an example computing device 1400 that can be used to implement the various embodiments described above. Computing device 1400 can be, for example, computing device 202 of FIG. 2 or any other suitable computing device.

Computing device 1400 includes one or more processors or processing units 1402, one or more memory and/or storage components 1404, one or more input/output (I/O) devices 1406, and a bus 1408 that allows the various components and devices to communicate with one another. Bus 1408 represents one or more of any of several types of bus structures, including a memory bus or memory controller, a peripheral bus, an accelerated graphics port, and a processor or local bus using any of a variety of bus architectures. Bus 1408 can include wired and/or wireless buses.

Memory/storage component 1404 represents one or more computer storage media. Component 1404 can include volatile media (such as random access memory (RAM)) and/or nonvolatile media (such as read only memory (ROM), Flash memory, optical disks, magnetic disks, and so forth). Component 1404 can include fixed media (e.g., RAM, ROM, a fixed hard drive, etc.) as well as removable media (e.g., a Flash memory drive, a removable hard drive, an optical disk, and so forth).

One or more input/output devices 1406 allow a user to enter commands and information to computing device 1400, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments described above enable, in a mapping context, various visual entities to be clustered into groups that do not occlude one another. In at least some embodiments, individual clusters are represented on a map by a puddle defined by a computed contour line. Users can interact with the puddle to acquire more information about the puddle's content. In at least some embodiments, user interaction can include zooming operations, clicking operations, hovering operations and the like.

In at least some embodiments, the various visual entities can be re-clustered responsive to user interaction. Re-clustering can, in at least some embodiments, include a transition animation that provides a logical visual link between a pre-transition puddle and one or more post-transition puddles.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. A computer-implemented method comprising:
    determining a screen size occupied by individual visual entities when the individual visual entities are presented on a map, the individual visual entities having different locations on the map;
    based at least on the screen size occupied by the individual visual entities, determining a first distance represented by the individual visual entities when the map is shown at a first scale and a second distance represented by the individual visual entities when the map is shown at a second scale;
    based at least on the first distance represented by the individual visual entities when the map is shown at the first scale, defining a first cluster of first visual entities that includes overlapping first visual entities that overlap on the map when the map is shown at the first scale;
    causing the map to be displayed at the first scale with a first puddle, the first puddle having a first irregular shape that encompasses the first visual entities of the first cluster;
    receiving a user action requesting a zoom-in operation to be performed on the map from the first scale to the second scale;
    based at least on the second distance represented by the individual visual entities when the map is shown at the second scale, defining a second cluster of second visual entities and a third cluster of third visual entities, the second cluster including overlapping second visual entities that overlap when the map is shown at the second scale and the third cluster including overlapping third visual entities that overlap when the map is shown at the second scale; and
    causing the map to be displayed at the second scale with a second puddle that encompasses the second cluster of second visual entities and a third puddle that encompasses the third cluster of third visual entities, the second puddle and the third puddle replacing the first puddle.

2. The method of claim 1, the screen size representing a diameter in pixels occupied by the individual visual entities.

3. The method of claim 1, wherein the second cluster does not include any visual entities that are also included in the third cluster.

4. The method of claim 1, wherein the first puddle includes at least some areas on the map that do not have a corresponding visual entity located thereon.

5. The method of claim 1, further comprising:
computing the first puddle, the second puddle, and the third puddle utilizing a bounding structure having vertices, the computing comprising iteratively moving the vertices closer to a border defined by a magnitude in 2D space associated with respective visual entities of the respective cluster, wherein the magnitude in 2D space for each vertex peaks at the vertex's location and decays away from the vertex's location.

6. The method of claim 1, further comprising rendering a single representative visual entity on the first puddle.

7. The method of claim 1, further comprising:
iteratively merging the individual visual entities into either the second cluster or the third cluster.

8. The method of claim 7, wherein the individual visual entities comprise push pins.

9. The method of claim 1, further comprising:
receiving another user action; and
responsive to receiving the another user action, providing additional information associated with the first puddle.

10. The method of claim 9, wherein the another user action comprises a click on or a hover over the first puddle.

11. The method of claim 9, wherein the additional information is presented in a preview or a miniature browser window.

12. The method of claim 1, wherein the first puddle is displayed without at least some visual entities of the first cluster, the second puddle is displayed without at least some visual entities of the second cluster, and the third puddle is displayed without at least some visual entities of the third cluster.

13. A system comprising:
one or more processors; and
one or more computer readable media having stored thereon computer readable instructions that, when executed by the one or more processors, cause the one or more processors to:
cause a first puddle to be displayed on a map shown at a first scale, the first puddle representing a first cluster of visual entities on the map;
receive a user action requesting a zoom-in operation on the map to a second scale;
determine that individual visual entities represented by the first cluster would overlap on the map when shown at the second scale;
cause the map to show a visual transition of the first puddle being replaced by a second puddle and a third puddle, the second puddle representing a second cluster of visual entities that includes the individual visual entities from the first cluster that would overlap on the map when shown at the second scale, the third puddle representing a third cluster of visual entities including at least some other visual entities included in the first cluster, the visual transition being performed by:
rendering a collection of vertices associated with the first cluster of visual entities in the first puddle;
removing the first puddle to leave the collection of vertices;
performing the zoom-in operation;
rendering the second puddle and the third puddle to include associated vertices of the collection of vertices; and
remove the associated vertices from the second puddle and the third puddle.

14. The system of claim 13, wherein the visual transition shows corresponding visual indications of respective directions from which the second puddle and the third puddle originate.

15. The system of claim 14, wherein the user action comprises a click on an instrumentality shown on the map.

16. The system of claim 14, wherein the visual transition comprises fading tails on individual visual entities moving toward the second puddle and the third puddle.

17. A system comprising:
one or more processors; and
one or more computer readable media having stored thereon computer readable instructions that, when executed by the one or more processors, cause the one or more processors to:
determine a screen size occupied by individual visual entities when the individual visual entities are presented on a map, the individual visual entities having different locations on the map;
based at least on the screen size occupied by the individual visual entities, determine a first distance represented by the individual visual entities when the map is shown at a first scale and a second distance represented by the individual visual entities when the map is shown at a second scale;
based at least on the first distance represented by the individual visual entities when the map is shown at the first scale, define a first cluster of first visual entities that includes overlapping first visual entities that overlap on the map when the map is shown at the first scale;
cause the map to be displayed at the first scale with a first puddle, the first puddle having a first irregular shape that encompasses the first visual entities of the first cluster;
receive a user action requesting a zoom-in operation to be performed on the map from the first scale to the second scale;
based at least on the second distance represented by the individual visual entities when the map is shown at the second scale, define a second cluster of second visual entities and a third cluster of third visual entities, the second cluster including overlapping second visual entities that overlap when the map is shown at the second scale and the third cluster including overlapping third visual entities that overlap when the map is shown at the second scale; and
cause the map to be displayed at the second scale with a second puddle that encompasses the second cluster of second visual entities and a third puddle that encompasses the third cluster of third visual entities, the second puddle and the third puddle replacing the first puddle.

18. The system of claim 17, wherein the first puddle, the second puddle, and the third puddle each have different irregular shapes defined by corresponding locations of respective visual entities therein.

19. The system of claim 17, embodied as a client computing device comprising a portable computer, a handheld computer, or a cell phone.

20. The system of claim 17, embodied as a server, wherein the computer readable instructions, when executed by the one or more processors, cause the one or more processors to:
send results to a client computing device, the results representing the map at the second scale with the second puddle and the third puddle.

* * * * *